United States Patent
Bell et al.

(10) Patent No.: US 11,481,265 B2
(45) Date of Patent: Oct. 25, 2022

(54) PERSISTENT HEALTH MONITORING FOR VOLATILE MEMORY SYSTEMS

(71) Applicant: Micron Technology, Inc., Boise, ID (US)

(72) Inventors: Debra M. Bell, Boise, ID (US); Kristen M. Hopper, Boise, ID (US); Erika Prosser, Boise, ID (US); Aaron P. Boehm, Boise, ID (US)

(73) Assignee: Micron Technology, Inc., Boise, ID (US)

(*) Notice: Subject to any disclaimer, the term of this patent is extended or adjusted under 35 U.S.C. 154(b) by 701 days.

(21) Appl. No.: 16/433,820

(22) Filed: Jun. 6, 2019

(65) Prior Publication Data

US 2020/0387422 A1     Dec. 10, 2020

(51) Int. Cl.
*G06F 11/00*     (2006.01)
*G06F 11/07*     (2006.01)
(Continued)

(52) U.S. Cl.
CPC .......... *G06F 11/0766* (2013.01); *G06F 1/206* (2013.01); *G06F 1/305* (2013.01); *G06F 3/0616* (2013.01); *G06F 11/3037* (2013.01)

(58) Field of Classification Search
CPC ............. G06F 11/0766; G06F 11/3037; G06F 11/3423; G06F 11/073; G06F 11/0754; G06F 11/3058
See application file for complete search history.

(56) References Cited

U.S. PATENT DOCUMENTS

| | | | |
|---|---|---|---|
| 6,456,928 B1 * | 9/2002 | Johnson | F02B 77/08 |
| | | | 714/48 |
| 7,350,046 B2 * | 3/2008 | Sicola | G06F 11/0751 |
| | | | 711/170 |

(Continued)

FOREIGN PATENT DOCUMENTS

KR     20080021853 A     3/2008

OTHER PUBLICATIONS

ISA/KR, International Search Report and Written Opinion of the international Searching Authority, Int'l Appl. No. PCT/US2020/034045, dated Aug. 28, 2020, Korean Intellectual Property Office, Seo-gu, Daejeon, Republic of Korea, 12 pgs.

*Primary Examiner* — Amine Riad
(74) *Attorney, Agent, or Firm* — Holland & Hart LLP

(57) ABSTRACT

Methods, systems, and devices for persistent health monitoring for volatile memory devices are described. A memory device may determine that an operating condition associated with an array of memory cells on the device, such as a temperature, current, voltage, or other metric of health status is outside of a range associated with a risk of device degradation. The memory device may monitor a duration over which the operating condition is outside of the range, and may determine whether the duration satisfies a threshold. In some cases, the memory device may store an indication of when (e.g., each time) the duration satisfied the threshold. The memory device may store the one or more indications in one or more non-volatile storage elements, such as fuses, which may enable the memory device to maintain a persistent indication of a cumulative duration over which the memory device is operated with operating conditions outside of the range.

25 Claims, 5 Drawing Sheets

(51) Int. Cl.
*G06F 3/06* (2006.01)
*G06F 1/30* (2006.01)
*G06F 1/20* (2006.01)
*G06F 11/30* (2006.01)

(56) References Cited

U.S. PATENT DOCUMENTS

| | | | | |
|---|---|---|---|---|
| 7,852,692 B2* | 12/2010 | Zhang | ............. | G11C 29/50012 |
| | | | | 365/189.11 |
| 7,882,394 B2* | 2/2011 | Hosek | .................. | G06F 11/008 |
| | | | | 714/48 |
| 7,908,606 B2* | 3/2011 | Depro | .................. | G06Q 50/06 |
| | | | | 705/412 |
| 8,078,918 B2* | 12/2011 | Diggs | .................. | G06F 11/008 |
| | | | | 714/42 |
| 8,175,254 B2* | 5/2012 | Li | ..................... | H04L 41/5025 |
| | | | | 379/265.14 |
| 8,374,823 B1* | 2/2013 | Williams | ............ | G06F 11/3058 |
| | | | | 714/728 |
| 8,949,181 B2* | 2/2015 | Stokkan | .................. | G06N 5/04 |
| | | | | 707/618 |
| 9,224,456 B2* | 12/2015 | Cometti | .................. | G11C 16/06 |
| 2007/0180328 A1* | 8/2007 | Cornwell | ............... | G11C 29/56 |
| | | | | 714/E11.038 |
| 2007/0263444 A1* | 11/2007 | Gorobets | ............. | G11C 16/349 |
| | | | | 365/185.09 |
| 2009/0175076 A1* | 7/2009 | Cho | ..................... | G11C 16/349 |
| | | | | 365/189.011 |
| 2010/0061168 A1* | 3/2010 | Aakjer | ............... | G11C 29/4401 |
| | | | | 365/201 |
| 2013/0289909 A1* | 10/2013 | Lin | ......................... | G01K 3/10 |
| | | | | 702/182 |
| 2013/0338450 A1* | 12/2013 | Osorio | .................. | G16H 40/63 |
| | | | | 600/300 |
| 2014/0229774 A1* | 8/2014 | Melik-Martirosian | ...................... | |
| | | | | G11C 16/12 |
| | | | | 714/704 |
| 2014/0247665 A1* | 9/2014 | Avila | ................. | G11C 16/3404 |
| | | | | 365/185.17 |

\* cited by examiner

PERSISTENT HEALTH MONITORING FOR VOLATILE MEMORY SYSTEMS

BACKGROUND

The following relates generally to systems that include at least one memory device and more specifically to persistent health monitoring for volatile memory devices.

Memory devices are widely used to store information in various electronic devices such as computers, wireless communication devices, cameras, digital displays, and the like. Information is stored by programing different states of a memory device. For example, binary devices most often store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

In some cases, a memory device may be used within a system that is configured for or specifies a high level of reliability. Such systems may include, for example, automotive or other safety-related systems. The health of a memory device may degrade over time, however, which may lead to memory errors.

DETAILED DESCRIPTION

Figure 1:
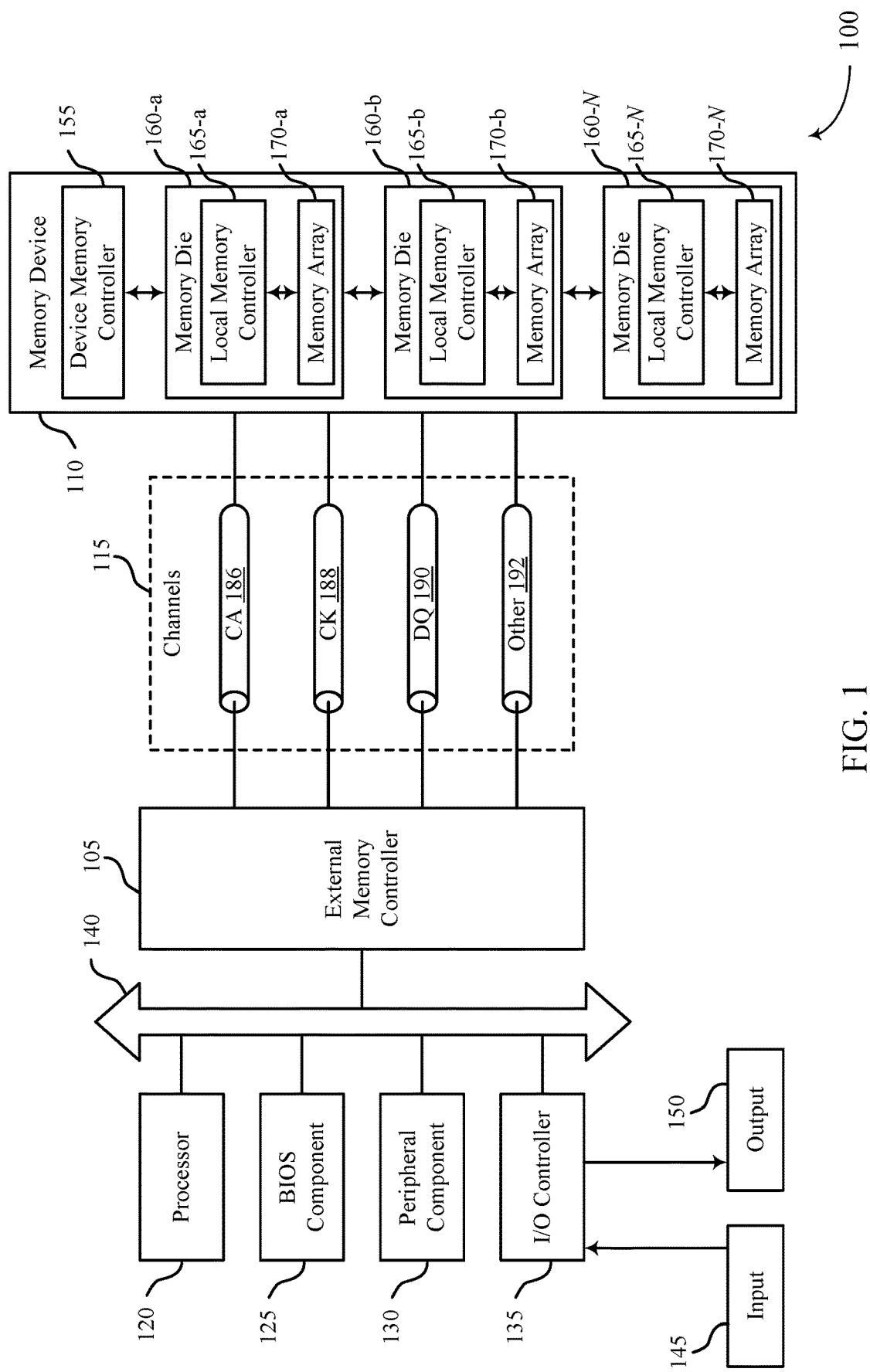
FIG. 1 illustrates an example of a system that supports persistent health monitoring for volatile memory devices in accordance with examples as disclosed herein.

In some cases, a memory device may be used within a system that is configured for or specifies a high level of reliability. Such systems may include, for example, automotive or other systems where safety is a substantial concern. A memory device may degrade over time due to various factors. Such degradation may cause errors in the memory device, which may be particularly problematic for these systems. Thus, in some cases, it may be desirable to monitor the health of a memory device to identify or predict degradation of the memory device before it reaches a significant or dangerous level.

In some cases, a memory device may degrade more quickly when it is operated under relatively demanding or severe operating conditions, such as when it is operated at higher temperatures, higher voltages, higher workloads, etc. Such operating conditions may be considered higher-risk operating conditions because a memory device may degrade more quickly when it is operated under severe operating conditions than when it is operated under less demanding conditions. In some cases, even operating a memory device in the upper portion of its rated operating range may be considered as operating under severe conditions and may result in faster degradation over time than operating the memory device in a more moderate portion of its rated operating range. Thus, in some cases, it may be possible to determine or identify a lower-risk range of operating conditions for a memory device that is associated with slower device degradation, and a higher-risk range of operating conditions (possibly including portions of the rated operating range) associated with faster device degradation.

In some cases, the degradation of a memory device may be predicted by monitoring the amount of time during which the device is operated under severe operating conditions; e.g., when the device is operated under operating conditions that are outside of a low-risk range. For example, a memory device may include one or more sensors, such as temperature or voltage sensors, to detect when the memory device is operated under severe operating conditions (e.g., one or more operating conditions is outside of a low-risk range), and a timer to determine the duration over which the memory device is operated under the severe operating conditions.

In some cases, it may be useful to store a record of the cumulative duration over which a memory device is operated under severe operating conditions. However, volatile memory devices, such as memory devices based on DRAM, may lose their state information each time the memory device is turned off. Such memory devices may lack a mechanism for tracking the cumulative amount of time during which the memory device is operated under severe operating conditions across periods during which the device is powered off. For example, if a memory device is operated under severe conditions for some quantity of minutes each time it is active, but loses this information when it is powered down, the cumulative duration over which the memory device is operated under severe conditions may not be known. Over time, such as over months or years, the cumulative duration may become significant, and may indicate that the memory device may begin (or may already have begun) degrading.

To address this issue, in some cases, the memory device may monitor a duration over which the device is operated under severe conditions and if the duration reaches or exceeds (e.g., satisfies) a threshold, the memory device may store, in a non-volatile storage element, an indication that the device has been operated under severe conditions for the threshold duration. The memory device may store the indication by, for example, blowing a fuse or writing the indication to external non-volatile memory. This approach may enable a memory device to maintain a persistent indicator of its health status across time periods when the memory device is powered off.

In some cases, a memory device may store an indication that the memory device has been operated under severe conditions for the threshold duration in an on-die volatile storage element, such as in a register, in addition to or instead of storing the indication in a non-volatile storage element. In this case, an external device, such as a host processor, may be configured to poll (e.g., read) the volatile storage element at various times. The external device may then determine how to respond to the information retrieved from the volatile storage element. For example, the external processor may be configured to retrieve the information from the volatile storage element and store the information in a non-volatile storage element (e.g., to non-volatile memory that is external to the memory die), or adjust an operating characteristic associated with the memory die (e.g., reduce a clock speed), or switch to another memory device, or alert a user, or take some other action based on the indication. The external device may itself maintain (or cause to be maintained) a persistent record of the cumulative duration over which the memory device has been operated under severe operating conditions, and may perform various actions based on the cumulative duration.

In some cases, the memory device may store an indication in a non-volatile storage element each time the duration exceeds the threshold. In some cases, a memory device may use a timer to determine whether the duration has reached or exceeded a threshold, and may restart the timer after storing the indication in the non-volatile storage element. For example, a memory device may blow a fuse in an on-die fuse array each time a timer indicates that the memory device has been operated under severe conditions for a period of time (e.g., 5, 10, 15, 20, 25 or 30 minutes), and may restart the timer after blowing each fuse.

In this manner, the non-volatile storage elements may maintain a persistent record of the cumulative duration across periods when the device is powered off. In some cases, the threshold duration may be relatively short compared to the frequency with which the memory device is typically powered off. For example, if a memory device is used within a system in which the memory device is typically powered on for about an hour before being powered off, the threshold duration may be (for example) 5 minutes, 10 minutes, 30 minutes, etc., so that the device may be more likely to capture information about the duration over which it is operated under severe conditions.

In some cases, the memory device may store the indication in consecutive non-volatile storage elements within an array of non-volatile storage elements. Returning to the previous example, a memory device may include an array of fuses and may blow a first fuse after the device has operating under severe operating conditions for 30 minutes, a second fuse after the device has operated under severe operating conditions for another 30 minutes, a third fuse after another 30 minutes, etc. In this manner, each non-volatile storage element may be associated with a particular cumulative duration over which the memory device has been operated under severe operating conditions.

In some cases, a particular non-volatile storage element may be associated with an alert such that if the memory device stores an indication in that particular non-volatile storage element, the memory device may transmit the alert to an external device (such as a host processor) to notify the external device that the memory device has reached the duration associated with the particular non-volatile storage element. The alert may provide a notification to the external device that the memory device may be degrading, allowing the external device to adjust various operating characteristics of the memory device or of the overall system, or issue a notification to a user, or take some other action.

Returning to the previous example, if the memory device blows a third fuse associated with operating under severe operating conditions for a cumulative duration of 90 minutes and that fuse is associated with an alert, the memory device may transmit the alert to the external device.

Thus, techniques described herein may enable a volatile memory device to maintain a persistent indication of its own health across periods during which the device is powered down, and to send alerts to an external device as needed to indicate critical operational thresholds that may be associated with degradation of the memory device. Techniques further allow an external device to monitor the health status of the memory device by, for example, polling a register of the memory device that may contain an indication that the memory device has been operated under severe operating conditions for a threshold duration.

Although the techniques described herein are primarily discussed in the context of volatile memory devices, such techniques may also be used for non-volatile memory devices without departing from the scope of the disclosure. For example, the use of separate non-volatile storage elements (such as fuses) for saving an indication that a non-volatile memory device has been operated with one or more operating conditions outside of a range (e.g., a low-risk range) for a threshold duration may be useful for providing a persistent record of the device's operating conditions after a catastrophic failure of the non-volatile memory device.

Features of the disclosure are initially described in the context of a memory system and memory die as described with reference to FIGS. 1 and 2. Features of the disclosure are described in the context of a system including a memory device as described with reference to FIG. 3. These and other features of the disclosure are further illustrated by and described with reference to an apparatus diagram and flowcharts that relate to persistent health monitoring for volatile memory devices as described with references to FIGS. 4-6.

FIG. 1 illustrates an example of a system 100 that utilizes one or more memory devices in accordance with examples as disclosed herein. The system 100 may include an external memory controller 105, a memory device 110, and a plurality of channels 115 coupling the external memory controller 105 with the memory device 110. The system 100 may include one or more memory devices, but for ease of description the one or more memory devices may be described as a single memory device 110.

The system 100 may include portions of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be component of the system configured to store data for one or more other components of the system 100. In some examples, the system 100 is capable of machine-type communication (MTC), machine-to-machine (M2M) communication, or device-to-device (D2D) communication.

At least portions of the system 100 may be examples of a host device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, some other stationary or portable electronic device, or the like. In some cases, the host device may refer to the hardware, firmware, software, or a combination thereof that implements the functions of the external memory controller 105. In some cases, the external memory controller 105 may be referred to as a host or host device. In some examples, system 100 is a graphics card.

In some cases, a memory device 110 may, based on saving an indication that the memory device has been operated under severe conditions (e.g., operated under operating conditions that are outside of a range) for a particular threshold duration, transmit an alert to a host device indicating that the memory device has been operated under severe operating conditions for the threshold duration. In this case, the host device may determine whether to change the operation of various system features, such as by switching to a different memory device, reducing the quantity or frequency of memory accesses, reducing the clock speed, issuing an alert to another system, etc.

In some cases, a host device may poll a volatile memory element on memory device 110 to determine whether the memory device 110 has been operated with one or more operating conditions outside of a range for the threshold duration. In some cases, the host device may poll the volatile memory element by synchronously or asynchronously reading the volatile memory element. In some cases, the host device may then store the indication in a non-volatile storage element that is off of the memory device 110 (e.g., off-die), for example. In some cases, the volatile storage element may be a register on memory device 110 or another type of volatile storage element that may be based on, for example, volatile memory cells, flip-flops, or latches.

In some cases, a memory device 110 may be an independent device or component that is configured to be in communication with other components of the system 100 and provide physical memory addresses/space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, and/or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. In some cases, a memory device 110 may include a single memory die 160. In some cases, a memory device 110 may include two or more memory dice 160 (e.g., memory chips) to support a desired or specified capacity for data storage. The memory device 110 including two or more memory dice 160 may be referred to as a multi-die memory or package (also referred to as multi-chip memory or package).

The system 100 may further include a processor 120, a basic input/output system (BIOS) component 125, one or more peripheral components 130, and an input/output (I/O) controller 135. The components of system 100 may be in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a graphics processing unit (GPU), a general purpose GPU (GPGPU), or a system on a chip (SoC), among other examples.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135, etc. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or specialized graphics ports. The peripheral component(s) 130 may be other components understood by those skilled in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input 145 may represent a device or signal external to the system 100 that provides information, signals, or data to the system 100 or its components. This may include a user interface or interface with or between other devices. In some cases, the input 145 may be a peripheral that interfaces with system 100 via one or more peripheral components 130 or may be managed by the I/O controller 135.

The output 150 may represent a device or signal external to the system 100 configured to receive an output from the system 100 or any of its components. Examples of the output 150 may include a display, audio speakers, a printing device, or another processor on printed circuit board, and so forth. In some cases, the output 150 may be a peripheral that interfaces with the system 100 via one or more peripheral components 130 or may be managed by the I/O controller 135.

The components of system 100 may be made up of general-purpose or special purpose circuitry designed to carry out their functions. This may include various circuit elements, for example, conductive lines, transistors, capacitors, inductors, resistors, amplifiers, or other active or passive elements, configured to carry out the functions described herein.

The memory device 110 may include a device memory controller 155 and one or more memory dice 160. In some cases, memory dice 160 may be fabricated using a semiconductor fabrication process associated with volatile memory cells. For example, memory dice 160 may be fabricated using a stacked DRAM process, a trench DRAM process, or a fin DRAM process, or another process. In some cases, a semiconductor process associated with fabrication of volatile memory cells may not support features of non-volatile memory cells, such as EEPROM or flash memory cells. For example, a volatile memory fabrication process may not support construction of tunneling diodes, devices capable of hot-electron injection for storing or discharging a floating gate, and the like. In addition, a DRAM process may not support high-voltage transistors (e.g., greater than a native voltage of a given process) for the internally boosted voltages used by EEPROM, flash, and other non-volatile memories. Thus, in some cases it may be impractical or unfeasible to fabricate non-volatile memory cells on a memory die 160 fabricated with a process conducive to high-density volatile memory cells.

Each memory die 160 may include a local memory controller 165 (e.g., local memory controller 165-a, local memory controller 165-b, and/or local memory controller 165-N) and a memory array 170 (e.g., memory array 170-a, memory array 170-b, and/or memory array 170-N). A memory array 170 may be a collection (e.g., a grid) of memory cells, with each memory cell being configured to store at least one bit of digital data. Features of memory arrays 170 and/or memory cells are described in more detail with reference to FIG. 2.

In some cases, a memory die 160 may include one or more sensors for detecting that an operating condition of the memory device 110 is outside of a range, indicating that memory device 110 may be operating under severe operating conditions. For example, a memory die 160 may include one or more temperature sensors, voltage sensors, etc. that may be configured to detect corresponding operating conditions of memory device 110.

In some cases, a memory die 160 may include one or more timers for monitoring (e.g., measuring) a duration over which a memory device 110 has been operated outside of a range (e.g., a low-risk range). For example, memory die 160 may include a timer coupled with a sensor on memory die 160. When the sensor detects that an operating condition of memory die 160 is outside of the range, the sensor may transmit a signal to the timer, which may initiate timing. If the timer reaches a threshold duration before the sensor indicates that the operating condition has returned to within a normal range, the timer may transmit a signal that causes the memory die 160 or memory device 110 to save an indication that the threshold duration has been satisfied (e.g., met or exceeded) in a non-volatile storage component, such as by blowing a fuse. In some cases, the timer may then be reset.

In some cases, a memory die 160 or memory device 110 may include an array of non-volatile storage elements, such as fuses, that may be used to store one or more indications that the memory device 110 has been operated with one or more operating conditions outside of a range for the threshold duration.

In some cases, values for the range and/or threshold duration may be programmed in memory device 110 and/or may be received from (e.g., configured by) an external device, such as a host processor. For example, the memory device 110 may have registers that hold values for ranges for voltage, power, temperature, or current, and may have a register for the duration. The registers may have default values that may be overridden by the device memory control 155 or external memory controller 105.

The memory device 110 may be an example of a two-dimensional (2D) array of memory cells or may be an example of a three-dimensional (3D) array of memory cells. For example, a 2D memory device may include a single memory die 160. A 3D memory device may include two or more memory dice 160 (e.g., memory die 160-a, memory die 160-b, and/or any quantity of memory dice 160-N). In a 3D memory device, a plurality of memory dice 160-N may be stacked on top of one another or next to one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the quantity of memory cells that may be positioned on a substrate as compared with a single 2D memory device, which in turn may reduce production costs or increase the performance of the memory array, or both. In some 3D memory device, different decks may share at least one common access line such that some decks may share at least one of a word line, a digit line, and/or a plate line.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may be configured to communicate with the external memory controller 105, the one or more memory dice 160, or the processor 120. In some cases, the memory device 110 may receive data and/or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120). In some cases, the device memory controller 155 may control operation of the memory device 110 described herein in conjunction with the local memory controller 165 of the memory die 160. Examples of the components included in the device memory controller 155 and/or the local memory controllers 165 may include receivers for demodulating signals received from the external memory controller 105, decoders for modulating and transmitting signals to the external memory controller 105, logic, decoders, amplifiers, filters, or the like.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 as described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120.

The external memory controller 105 may be configured to enable communication of information, data, and/or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal.

In some cases, the external memory controller 105 or other component of the system 100, or its functions described herein, may be implemented by the processor 120. For example, the external memory controller 105 may be hardware, firmware, or software, or some combination thereof implemented by the processor 120 or other component of the system 100. While the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may in some cases be performed by the external memory controller 105 (either separate from or as included in the processor 120).

The components of the system 100 may exchange information with the memory device 110 using a plurality of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel.

In some cases, a pin or pad of a terminal may be part of a signal path of the channel 115. Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170).

Channels 115 (and associated signal paths and terminals) may be dedicated to communicating specific types of information. In some cases, a channel 115 may be an aggregated channel and thus may include multiple individual channels. For example, a data channel 190 may be x4 (e.g., including four signal paths), x8 (e.g., including eight signal paths), x16 (including sixteen signal paths), and so forth. Signals communicated over the channels may use double data rate (DDR) signaling. For example, some symbols of a signal may be registered on a rising edge of a clock signal and other symbols of the signal may be registered on a falling edge of the clock signal. Signals communicated over channels may use single data rate (SDR) signaling. For example, one symbol of the signal may be registered for each clock cycle.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge and/or a falling clock signal edge. In some cases, a CA channel 186 may include any quantity of signal paths to decode address and command data (e.g., eight or nine signal paths).

In some cases, the channels 115 may include one or more clock signal (CK) channels 188. The CK channels 188 may be configured to communicate one or more common clock signals between the external memory controller 105 and the memory device 110. Each clock signal may be configured to oscillate between a high state and a low state and coordinate the actions of the external memory controller 105 and the memory device 110. In some cases, the clock signal may be a differential output (e.g., a CK_t signal and a CK_c signal) and the signal paths of the CK channels 188 may be configured accordingly. In some cases, the clock signal may be single ended. A CK channel 188 may include any quantity of signal paths. In some cases, the clock signal CK (e.g., a CK_t signal and a CK_c signal) may provide a timing reference for command and addressing operations for the memory device 110, or other system-wide operations for the memory device 110. The clock signal CK therefore may be variously referred to as a control clock signal CK, a command clock signal CK, or a system clock signal CK. The system clock signal CK may be generated by a system clock, which may include one or more hardware components (e.g., oscillators, crystals, logic gates, transistors, or the like).

In some cases, an external memory controller 105 may synchronously poll a volatile storage element of memory device 100 to check for an indication that the memory device 110 has been operated with operating conditions outside of a range for a threshold duration. That is, an external memory controller 105 may read the contents of the volatile storage element at times that are based on timing associated with one or more clock signals. In some cases, an external memory controller 105 may asynchronously read a volatile storage element of memory device 100 to check for an indication that the memory device 110 has been operated with operating conditions outside of a range for a threshold duration. That is, an external memory controller 105 may read the contents of the volatile storage element at times that are not based on one or more clock signals.

In some cases, the channels 115 may include one or more data (DQ) channels 190. The data channels 190 may be configured to communicate data and/or control information between the external memory controller 105 and the memory device 110. For example, the data channels 190 may communicate information (e.g., bi-directional) to be written to the memory device 110 or information read from the memory device 110.

In some cases, the channels 115 may include one or more other channels 192 that may be dedicated to other purposes. These other channels 192 may include any quantity of signal paths.

In some cases, the other channels 192 may include one or more write clock signal (WCK) channels. While the 'W' in WCK may nominally stand for "write," a write clock signal WCK (e.g., a WCK_t signal and a WCK_c signal) may provide a timing reference for access operations generally for the memory device 110 (e.g., a timing reference for both read and write operations). Accordingly, the write clock signal WCK may also be referred to as a data clock signal WCK. The WCK channels may be configured to communicate a common data clock signal between the external memory controller 105 and the memory device 110. The data clock signal may be configured to coordinate an access operation (e.g., a write operation or read operation) of the external memory controller 105 and the memory device 110. In some cases, the write clock signal may be a differential output (e.g., a WCK_t signal and a WCK_c signal) and the signal paths of the WCK channels may be configured accordingly. A WCK channel may include any quantity of signal paths. The data clock signal WCK may be generated by a data clock, which may include one or more hardware components (e.g., oscillators, crystals, logic gates, transistors, or the like).

In some cases, the other channels 192 may include one or more error detection code (EDC) channels. The EDC channels may be configured to communicate error detection signals, such as checksums, to improve system reliability. An EDC channel may include any quantity of signal paths.

In some cases, one or more channels, such as CA channels 186 or other channels 192, may be configured to transmit (e.g., to an external device) an indication that the duration over which an operating condition is outside a range satisfies (e.g., meets or exceeds) a threshold duration.

The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer.

Signals communicated over the channels 115 may be modulated using a variety of different modulation schemes. In some cases, a binary-symbol (or binary-level) modulation scheme may be used to modulate signals communicated between the external memory controller 105 and the memory device 110. A binary-symbol modulation scheme may be an example of a M-ary modulation scheme where M is equal to two. Each symbol of a binary-symbol modulation scheme may be configured to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

In some cases, a multi-symbol (or multi-level) modulation scheme may be used to modulate signals communicated between the external memory controller 105 and the memory device 110. A multi-symbol modulation scheme may be an example of a M-ary modulation scheme where M is greater than or equal to three. Each symbol of a multi-symbol modulation scheme may be configured to represent more than one bit of digital data (e.g., a symbol may represent a logic 00, a logic 01, a logic 10, or a logic 11). Examples of multi-symbol modulation schemes include, but are not limited to, PAM3, PAM4, PAM8, etc., quadrature amplitude modulation (QAM), quadrature phase shift keying (QPSK), and/or others. A multi-symbol signal (e.g., a PAM3 signal or a PAM4 signal) may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

Figure 2:
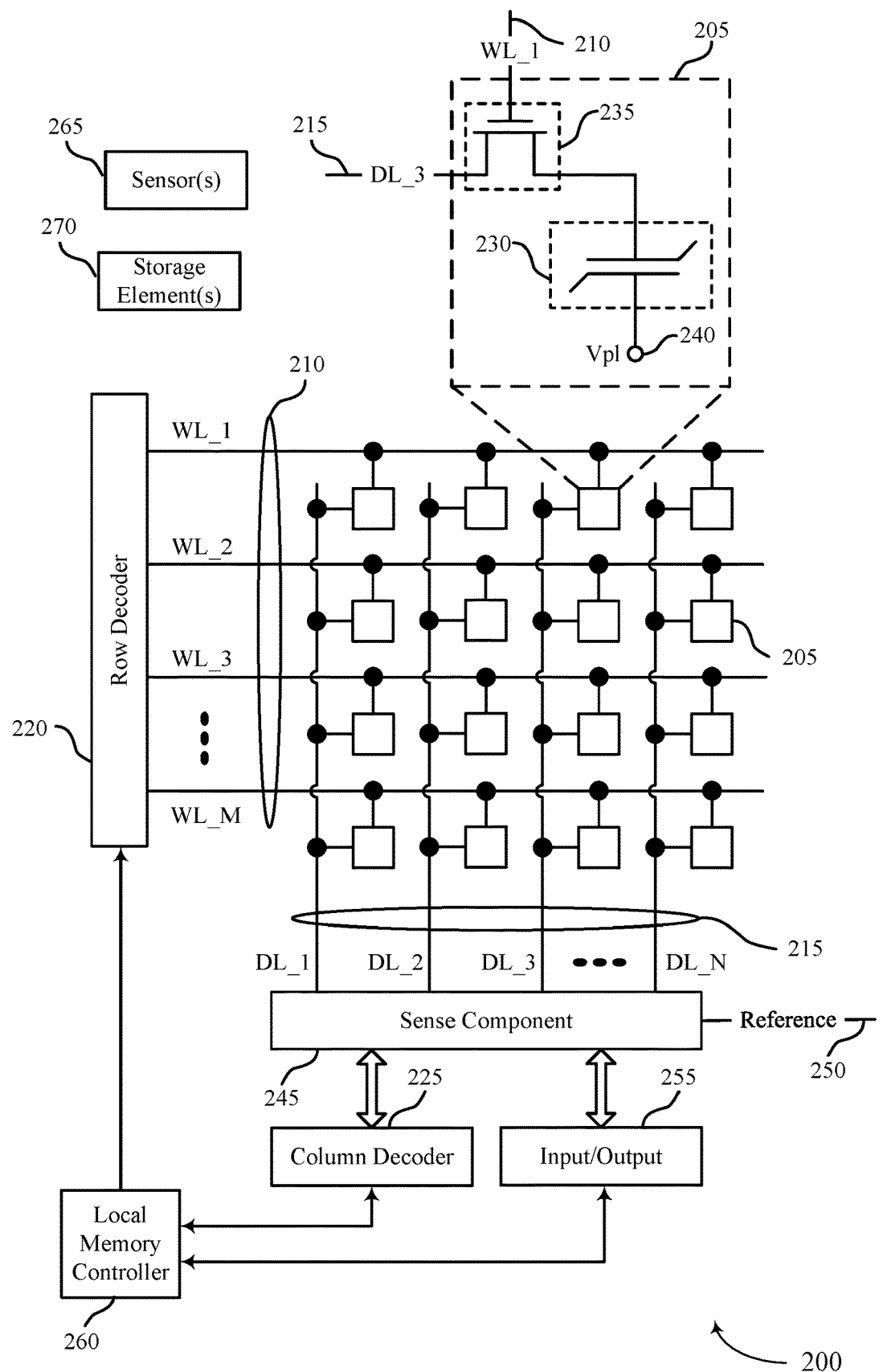
FIG. 2 illustrates an example of a memory die that supports persistent health monitoring for volatile memory devices in accordance with examples as disclosed herein.

FIG. 2 illustrates an example of a memory die 200 in accordance with examples as disclosed herein. The memory die 200 may be an example of the memory dice 160 described with reference to FIG. 1. In some cases, the memory die 200 may be referred to as a memory chip, a memory device, or an electronic memory apparatus. The memory die 200 may include one or more memory cells 205 that are programmable to store different logic states. Each memory cell 205 may be programmable to store two or more states. For example, the memory cell 205 may be configured to store one bit of digital logic at a time (e.g., a logic 0 and a logic 1). In some cases, a single memory cell 205 (e.g., a multi-level memory cell) may be configured to store more than one bit of digit logic at a time (e.g., a logic 00, logic 01, logic 10, or a logic 11).

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed.

Operations such as reading and writing may be performed on memory cells 205 by activating or selecting access lines such as a word line 210 and/or a digit line 215. In some cases, digit lines 215 may also be referred to as bit lines. References to access lines, word lines and digit lines, or their analogues, are interchangeable without loss of understanding or operation. Activating or selecting a word line 210 or a digit line 215 may include applying a voltage to the respective line.

The memory die 200 may include the access lines (e.g., the word lines 210 and the digit lines 215) arranged in a grid-like pattern. Memory cells 205 may be positioned at intersections of the word lines 210 and the digit lines 215. By biasing a word line 210 and a digit line 215 (e.g., applying a voltage to the word line 210 or the digit line 215), a single memory cell 205 may be accessed at their intersection.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address. For example, the memory die 200 may include multiple word lines 210, labeled WL_1 through WL_M, and multiple digit lines 215, labeled DL_1 through DL_N, where M and N depend on the size of the memory array. Thus, by activating a word line 210 and a digit line 215, e.g., WL_1 and DL_3, the memory cell 205 at their intersection may be accessed. The intersection of a word line 210 and a digit line 215, in either a two-dimensional or three-dimensional configuration, may be referred to as an address of a memory cell 205.

The memory cell 205 may include a logic storage component, such as capacitor 230 and a switching component 235. The capacitor 230 may be an example of a dielectric capacitor or a ferroelectric capacitor. A first node of the capacitor 230 may be coupled with the switching component 235 and a second node of the capacitor 230 may be coupled with a voltage source 240. In some cases, the voltage source 240 may be the cell plate reference voltage, such as Vpl, or may be ground, such as Vss. In some cases, the voltage source 240 may be an example of a plate line coupled with a plate line driver. The switching component 235 may be an example of a transistor or any other type of switch device that selectively establishes or de-establishes electronic communication between two components.

Selecting or deselecting the memory cell 205 may be accomplished by activating or deactivating the switching component 235. The capacitor 230 may be in electronic communication with the digit line 215 using the switching component 235. For example, the capacitor 230 may be isolated from digit line 215 when the switching component 235 is deactivated, and the capacitor 230 may be coupled with digit line 215 when the switching component 235 is activated. In some cases, the switching component 235 is a transistor and its operation may be controlled by applying a voltage to the transistor gate, where the voltage differential between the transistor gate and transistor source may be greater or less than a threshold voltage of the transistor. In some cases, the switching component 235 may be a p-type transistor or an n-type transistor. The word line 210 may be in electronic communication with the gate of the switching component 235 and may activate/deactivate the switching component 235 based on a voltage being applied to word line 210.

A word line 210 may be a conductive line in electronic communication with a memory cell 205 that is used to perform access operations on the memory cell 205. In some architectures, the word line 210 may be in electronic communication with a gate of a switching component 235 of a memory cell 205 and may be configured to control the switching component 235 of the memory cell. In some architectures, the word line 210 may be in electronic communication with a node of the capacitor of the memory cell 205 and the memory cell 205 may not include a switching component.

A digit line 215 may be a conductive line that connects the memory cell 205 with a sense component 245. In some architectures, the memory cell 205 may be selectively coupled with the digit line 215 during portions of an access operation. For example, the word line 210 and the switching component 235 of the memory cell 205 may be configured to couple and/or isolate the capacitor 230 of the memory cell 205 and the digit line 215. In some architectures, the memory cell 205 may be in electronic communication (e.g., constant) with the digit line 215.

The sense component 245 may be configured to detect a state (e.g., a charge) stored on the capacitor 230 of the memory cell 205 and determine a logic state of the memory cell 205 based on the stored state. The charge stored by a memory cell 205 may be extremely small, in some cases. As such, the sense component 245 may include one or more sense amplifiers to amplify the signal output by the memory cell 205. The sense amplifiers may detect small changes in the charge of a digit line 215 during a read operation and may produce signals corresponding to a logic state 0 or a logic state 1 based on the detected charge. During a read operation, the capacitor 230 of memory cell 205 may output a signal (e.g., discharge a charge) to its corresponding digit line 215. The signal may cause a voltage of the digit line 215 to change. The sense component 245 may be configured to compare the signal received from the memory cell 205 across the digit line 215 to a reference signal 250 (e.g., reference voltage). The sense component 245 may determine the stored state of the memory cell 205 based on the comparison. For example, in binary signaling, if digit line 215 has a higher voltage than the reference signal 250, the sense component 245 may determine that the stored state of memory cell 205 is a logic 1 and, if the digit line 215 has a lower voltage than the reference signal 250, the sense component 245 may determine that the stored state of the memory cell 205 is a logic 0. The sense component 245 may include various transistors or amplifiers to detect and amplify a difference in the signals. The detected logic state of the memory cell 205 may be provided as an output of the sense component 245 (e.g., to an input/output 255), and may indicate the detected logic state to another component of a memory device 110 that includes the memory die 200, such as a device memory controller 155 (e.g., directly or using the local memory controller 260).

The local memory controller 260 may control the operation of memory cells 205 through the various components (e.g., row decoder 220, column decoder 225, and sense component 245). The local memory controller 260 may be an example of the local memory controller 165 described with reference to FIG. 1. In some cases, one or more of the row decoder 220, column decoder 225, and sense component 245 may be co-located with the local memory controller 260. The local memory controller 260 may be configured to receive commands and/or data from an external memory controller 105 (or a device memory controller 155 described with reference to FIG. 1), translate the commands and/or data into information that can be used by the memory die 200, perform one or more operations on the memory die 200, and communicate data from the memory die 200 to the external memory controller 105 (or the device memory controller 155) in response to performing the one or more operations. The local memory controller 260 may generate row and column address signals to activate the target word line 210 and the target digit line 215. The local memory controller 260 may also generate and control various voltages or currents used during the operation of the memory die 200. In general, the amplitude, shape, or duration of an applied voltage or current discussed herein may be adjusted or varied and may be different for the various operations discussed in operating the memory die 200.

In some cases, the local memory controller 260 may be configured to perform a write operation (e.g., a programming operation) on one or more memory cells 205 of the memory die 200. During a write operation, a memory cell 205 of the memory die 200 may be programmed to store a desired logic state. In some cases, a plurality of memory cells 205 may be programmed during a single write operation. The local memory controller 260 may identify a target memory cell 205 on which to perform the write operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The local memory controller 260 may apply a specific signal (e.g., voltage) to the digit line 215 during the write operation to store a specific state (e.g., charge) in the capacitor 230 of the memory cell 205, the specific state (e.g., charge) may be indicative of a desired logic state.

In some cases, the local memory controller 260 may be configured to perform a read operation (e.g., a sense operation) on one or more memory cells 205 of the memory die 200. During a read operation, the logic state stored in a memory cell 205 of the memory die 200 may be determined. In some cases, a plurality of memory cells 205 may be sensed during a single read operation. The local memory controller 260 may identify a target memory cell 205 on which to perform the read operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The target memory cell 205 may transfer a signal to the sense component 245 in response to biasing the access lines. The sense component 245 may amplify the signal. The local memory controller 260 may fire the sense component 245 (e.g., latch the sense component) and thereby compare the signal received from the memory cell 205 to the reference signal 250. Based on that comparison, the sense component 245 may determine a logic state that is stored on the memory cell 205. The local memory controller 260 may communicate the logic state stored on the memory cell 205 to the external memory controller 105 (or the device memory controller 155) as part of the read operation.

In some memory architectures, accessing the memory cell 205 may degrade or destroy the logic state stored in a memory cell 205. For example, activation of a word line in DRAM architectures may partially or completely discharge the capacitor of the target memory cell. The sense component 245 may restore the voltage on the digit line 215 according to the sensed logic state, which may restore the voltage on the memory cell 205 to a same or similar voltage as used in the write operation. Thus, read operations performed in DRAM architectures may restore the logic state of memory cells 205, as long as a sufficient level is present for the sense component 245 to resolve the stored logic state.

In some memory architectures based on volatile memory cells, such as DRAM, the state of a memory cell 205 may need to be periodically refreshed to maintain the state of the memory cell 205 when the memory cell 205 is not accessed for a period of time (and therefore is not restored as part of a read or write operation). Thus, memory die 200 may include logic circuitry that may be configured to periodically perform a refresh procedure on memory cells 205 of one or more rows 275 by reading and restoring (e.g., firing sense component 245 to amplify the voltage on the memory cells 205 back to the originally written voltage levels) the states of the memory cells 205. In some cases, such logic circuitry may be part of local memory controller 260 or may be separate circuitry. In some cases, memory die 200 may perform a refresh procedure on memory cells 205 of one or more rows 275 in response to receiving a refresh command from an external host device or based on internal timing that specifies a frequency with which memory cells 205 may be refreshed.

In some cases, a memory die 200 may include one or more sensors 265 that may be configured to sense one or more operating conditions associated with memory die 200, such as a temperature, voltage, power, etc. associated with memory die 200. In some cases, sensors 265 may include one or more temperatures sensors, one or more voltage sensors, one or more power sensors, or other types of sensors or circuits that may be configured to detect a value of the operating condition. Sensors 265 may be located at various physical locations on memory die 200 to enable sensors 265 to detect the operating conditions at the locations.

In some cases, the operating condition may include one or more metrics based on a quantity of bit errors associated with the memory device, which may provide an indication of a health status of the memory device. For example, a memory die 200 may be configured to monitor (e.g., determine, detect) a value of the quantity of bit errors in a memory array of the memory die 200 over time by performing error detection procedures, such as error correcting code (ECC) procedures, rather than by sensing a value using a sensor 320. In some cases, a health status of the device may be determined based on the detected quantity of bit errors or change in the quantity of bit errors. In some examples, the memory die 200 may indicate the health status to an external memory controller.

In some cases, a memory die 200 may be configured to determine that an operating condition associated with an array of memory cells (such as memory cells 205, which may be within a memory array 170 and reside on memory die 200) is outside a range, and monitor, based on determining that the operating condition is outside the range, a duration over which the operating condition is outside the range. Memory die 200 may be configured to determine whether the duration satisfies (e.g., meets or exceeds) a threshold duration and store, in one or more storage elements 270 associated with the threshold duration, an indication that the duration satisfies the threshold duration. Storage elements 270 may be on memory die 200, for example, and may be or may include non-volatile storage elements or volatile storage elements.

In some cases, storage elements 270 may include one-time programmable storage elements, such as fuses or non-volatile memory cells that may be written only once. In some cases, a fuse may include an electrical element, such as a polysilicon wire, that is "blown" by applying a relatively large current to the element, thereby causing a change in the electrical properties of the element that, for example, increases the resistance across the electrical element. In some cases, blowing the electrical element may cause the electrical element to behave as an open circuit, which may be detectable by current or voltage sensing circuitry.

In some cases, storage elements 270 may include re-programmable non-volatile storage elements, such as non-volatile memory cells that may be re-written multiple times. Non-volatile storage elements may be fabricated using a different fabrication process than volatile storage elements, however, and thus it may be challenging to fabricate both types of storage elements on a single die.

In some cases, storage elements 270 may include volatile storage elements, such as volatile memory cells, registers, counters, etc.

Figure 3:
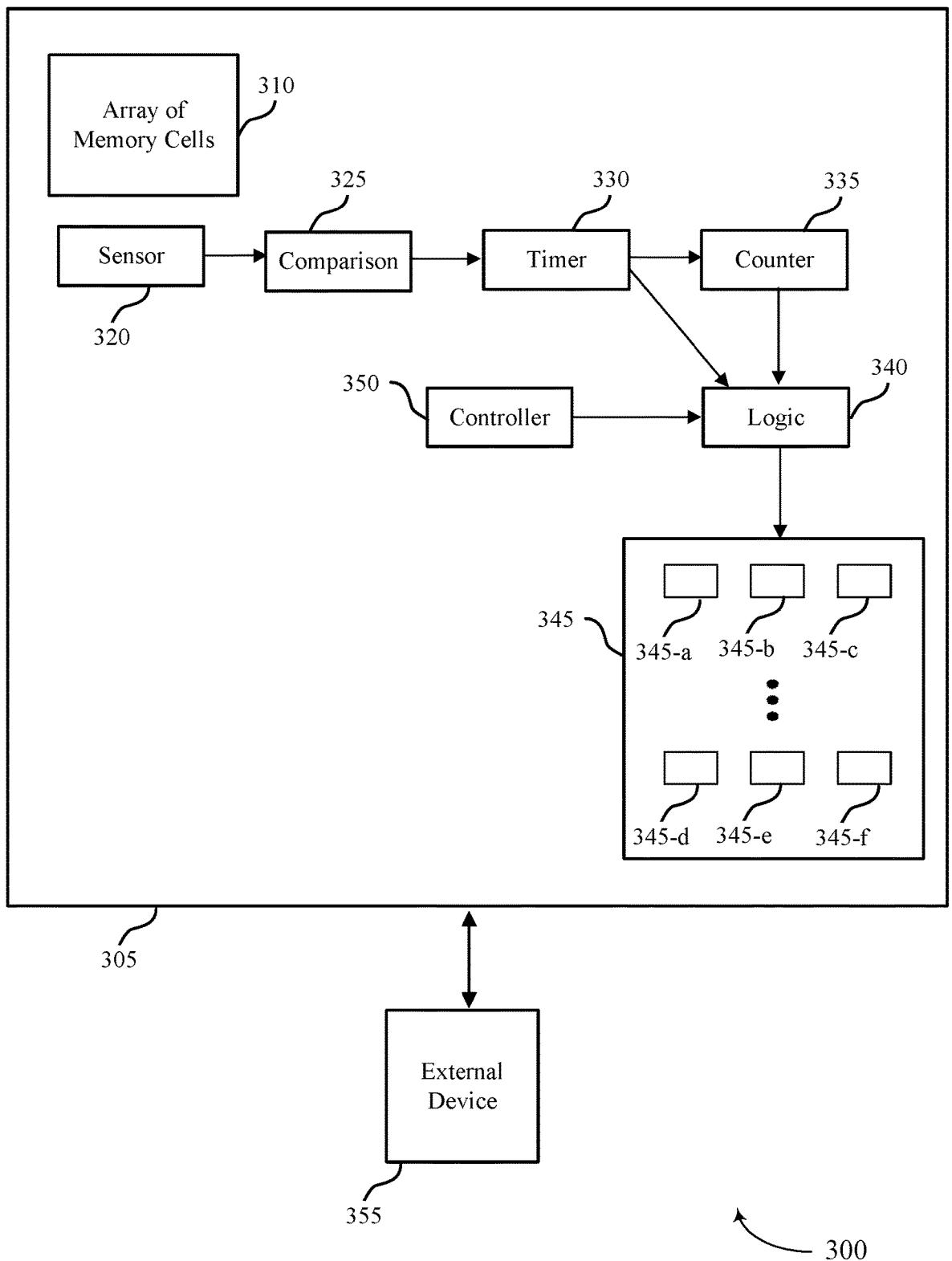
FIG. 3 illustrates an example of a system 300 that supports persistent health monitoring for volatile memory devices in accordance with examples as disclosed herein.

FIG. 3 illustrates an example of a system 300 that supports persistent health monitoring for volatile memory devices in accordance with examples as disclosed herein.

System 300 includes memory device 305, which may be an example of memory device 110 and/or memory die 200 as depicted in FIGS. 1 and 2, respectively. Memory device 305 includes an array of memory cells 310, may include memory cells 205 that may be part of a memory array 170 as discussed with reference to FIGS. 1 and 2. Array of memory cells 310 may include volatile memory cells, such as DRAM memory cells, or non-volatile memory cells, such as FeRAM or flash memory cells.

Memory device 305 may include a set of one or more storage elements 345 for maintaining a persistent record of a cumulative amount of time over which the memory device 305 is operated under severe operating conditions, such as when one or more operating conditions of memory device 305 are outside of a corresponding range.

Memory device 305 may include one or more sensors 320. Sensor 320 may be configured to sense (e.g., determine) a value of an operating condition associated with the array of memory cells 310. In some cases, sensor 320 may be located on the same die as array of memory cells 310. Sensor 320 may be, for example, a temperature sensor, voltage sensor (e.g., for sensing an input voltage to the memory device such as a VDD voltage), current sensor, power sensor, vibration sensor, acceleration sensor, radiation sensor, or another type of sensor.

In some cases, memory device 305 may include multiple sensors 320, which may be the same or different types of sensors. For example, memory device 305 may include multiple temperature sensors at different locations on memory device 305 to enable memory device 305 to monitor the temperature associated with the array of memory cells 310 at multiple locations. For example, memory device 305 may include a temperature sensor and a voltage sensor to monitor both the temperature and voltage associated with the array of memory cells 310.

In some cases, sensor 320 may be configured to output a signal indicating the value of the sensed operating condition, for example.

Memory device 305 may include comparison element 325. Comparison element 325 may be coupled with sensor 320 and configured to receive a signal from sensor 320 that indicates a value of a sensed operating condition. In some cases, comparison element 325 may be located on a memory die with the array of memory cells 310. In some cases, comparison element 325 may be included in a local memory controller 165, 260 or in a device memory controller 155, or in a sensor 320, or may be separate circuitry.

In some cases, comparison element 325 may be configured to determine, based on the signal received from sensor 320, that an operating condition associated with array of memory cells 310 is outside of a range, and output a signal indicating that the operating condition is outside of the range. For example, comparison element 325 may determine that the operating condition is outside of the range when the sensed value of an operating condition (e.g., as received in a signal from sensor 320) is above an upper threshold value for the operating condition or below a lower threshold value for an operating condition. In some cases, comparison element 325 may include a comparator that is configured to compare the signal received from sensor 320 with one or more threshold values (e.g., stored in the comparator) and output a signal based on the comparison. For example, a comparator may output a signal indicating the operating condition is outside of the range, or a signal indicating that the comparison is within the range or no signal, depending on the comparison.

In some cases, comparison element 325 (or other components of memory die 200) may include circuitry capable of determining an amount by which the operating condition is outside of the range, which may quantify the severity of the operating conditions, for example. In some cases, comparison element may be configured to output (e.g., to timer 330, or logic circuitry 340, or another component) a signal indicating an amount by which the operating condition is outside of the range.

Memory device 305 may include timer 330. Timer 330 may be coupled with comparison element 325 and configured to receive the signal indicating that the operating condition is outside of the operating range from comparison element 325. In some cases, when comparison element 325 outputs a signal indicating that an operating condition of memory device 305 is outside of the operating range, timer 330 may start measuring (monitoring) an elapsed time over which the operating condition is outside the operating range based on the signal received from comparison element 325. In some cases, timer 330 may be started (e.g., initiated) based on receiving a signal from comparison element 325, and may continue timing the duration (e.g., the elapsed time) as long as (e.g., while) timer 330 continues to receive a signal indicating that the operating condition is outside of the range. In some cases, if timer 330 ceases to receive the signal from comparison element 325, timer 330 may cease timing the duration. In some cases, if timer 330 subsequently receives the signal indicating that the operating condition is again outside of the operating range, timer 330 may continue timing the duration from the previous time value, or may be reset and begin timing the duration again from an initial time of zero.

In some cases, if timer 330 determines, based on the signal received from comparison element 325, that the duration over which the operating condition is outside of the operating range satisfies (e.g., meets or exceeds) a threshold, timer 330 may output a signal indicating that the duration satisfies the threshold. Timer 330 may then be reset and may, if comparison element 325 continues to output a signal indicating that an operating condition is outside a range, re-initiate timing the duration over which the operating is outside the range based on the signal received from comparison element 325. In some cases, timer 330 may output a signal indicating that the duration satisfies a threshold each time (e.g., each occurrence) timer 330 determines that the duration satisfies the threshold.

In some cases, timer 330 may be configured to initiate timing a duration if any one of multiple operating conditions are outside a range. For example, a memory device 305 may include multiple sensors 320 and in some cases, multiple comparison elements 325 that may be configured to determine whether any of the sensed operating conditions are outside of a corresponding range. In some cases, timer 330 may be configured to receive a single signal (e.g., from a comparison element 325 or from a multiplexer) indicating when any one of multiple operating conditions is outside of their respective range. In some cases, timer 330 may be configured to receive separate signals (e.g., from separate comparison elements 325) indicating when each operating condition is outside of its corresponding range.

In some cases, the threshold duration may be determined by (e.g., may depend on) various factors or combinations of factors related to the likelihood of device degradation. For example, in some cases, each sensor 320 or each type of sensor 320 may be associated with a different threshold duration; that is, the threshold duration may depend on the particular operating condition being sensed. For example, a threshold duration for temperature may be different than a threshold duration for voltage.

In some cases, the threshold duration may be based on an amount by which the operating condition is outside of the range. For example, the threshold duration may be shorter when the operating condition is far outside of the range than when the operating condition is slightly outside of the range. The timer 330 may, for example, integrate the amount by which the operating condition is outside of the range and compare the integrated value to one or more thresholds.

In some cases, the threshold duration may be based on the status of multiple operating conditions. For example, the threshold duration may be shorter if both the temperature and voltage are outside of their respective ranges than if the temperature or voltage were outside of its respective range.

In some cases, the threshold duration may be based on a weighted combination of factors that may include, for example, the quantity of operating conditions that are outside of their respective ranges, and/or an amount by which various operating conditions are outside of their respective ranges, or various other combinations of factors.

In some cases, one or more threshold durations may be stored on memory device 305, such as in registers, and accessed by timer 330 for determining whether the duration satisfies the threshold. In some cases, a threshold duration may be configured by an external controller.

In some cases, timer 330 may output the signal indicating that the duration satisfies the threshold to logic circuitry 340 on memory device 305. In some cases, logic circuitry 340 may be configured to store an indication that the duration satisfies the threshold in one or more storage elements 345-a, 345-b, 345-c, 345-d, 345-e, 345-f that may be included in a set of storage elements 345 on memory device 305.

In some cases, the set of storage elements 345 may include a set of one-time programmable storage elements, such as a set of fuses or one-time programmable memory cells. In some cases, the set of storage elements 345 may include a set of volatile storage elements, such as volatile memory cells. Although the set of storage elements 345 is depicted in FIG. 3 as being included in memory device 305, in some cases, the set of storage elements 345 may be external to memory device 305 (e.g., off-chip or off-die). In some cases, the set of storage elements 345 may be coupled with the memory device 305 and/or may be coupled with an external device.

In some cases, logic circuitry 340 may identify a particular storage element in the set of storage elements 345 for storing the indication. In some cases, each storage element 345 in the set of storage elements 345 may be associated with a particular threshold duration, and logic circuitry 340 may select, based on the signal indicating that the duration has satisfied a particular threshold duration, the storage element 345 that is associated with the particular threshold duration. For example, one storage element 345 may be associated with a threshold duration of 10 minutes and another storage element 345 may be associated with a threshold duration of 30 minutes.

In some cases, logic circuitry 340 may select storage elements consecutively, such as from left to right or top to bottom in an array (set) of storage elements. For example, logic circuitry 340 may receive a signal indicating that the duration satisfies the threshold, and may select the next consecutive unused storage element in the set of storage elements 345 to store the indication that the duration satisfies the threshold. In some cases, the quantity of consecutive storage elements that contain an indication that the duration satisfies the threshold may provide an indication of a cumulative duration over which one or more operating conditions were outside of a range.

In some cases, logic circuitry 340 may select storage elements non-consecutively, such as by skipping consecutive storage elements. For example, skipping a storage element may indicate that the threshold duration has been satisfied 5x, or 10x, or based on some other multiplier or exponential function. In some cases, skipping consecutive storage elements may save storage elements and reduce the power to store an indication that the duration has satisfied a threshold. In some cases, logic circuitry 340 may select non-consecutive storage elements when it is provided with time to store the indication(s) during a power down cycle.

Thus, in some cases, the quantity and/or position of a storage element in the set of storage elements 345 that have been used to store an indication that the duration satisfies the threshold may provide an indication of a cumulative amount of time a memory device 305 has been operated with one or more operating conditions outside of a range, as detected by sensor 320 and measured by timer 330.

In some cases, memory device 305 may include counter 335 that is coupled with timer 330. Counter 335 may be configured to count a quantity of times that the duration satisfies the threshold based on a quantity of instances when counter 335 receives a signal from timer 330. In some cases, counter 335 may be configured to output, to logic circuitry 340, a signal indicating the quantity of times the duration satisfied the threshold. In some cases, logic circuitry 340 may select the one or more storage elements 345 based on the signal received from counter 335. For example, if counter 335 outputs a signal indicating that the duration satisfied the threshold three (3) times (or indicating an equivalent duration), logic circuitry 340 may select three (3) storage elements 345 and store an indication that the duration satisfied the threshold in each of the selected storage elements 345. In some cases, logic circuitry 340 may store the indications in the selected storage elements 345 each time a duration satisfies the threshold, or may store the indications in the selected storage elements 345 at a later time, such as during a power down procedure. The quantity of storage elements 345 need not match the quantity of times the duration satisfied the threshold, however. In some cases, different storage elements 345 may be associated with different thresholds. For example, logic circuitry 340 may select a single storage element 345 that corresponds to a total duration indicated by the quantity of times the duration satisfied the threshold.

In some cases, the set of storage elements 345 may include a set of fuses for storing the indications that the duration satisfies the threshold. Blowing a fuse on memory device 305 may consume a significant amount of power, however, which may disrupt or degrade normal operations of memory device 305. Thus, in some cases, memory device 305 may wait to blow a fuse (or to store the indication in another type of storage element) until memory device 305 is idle or otherwise operating under suitable conditions.

For example, logic circuitry 340 may receive a signal from timer 330 or counter 335 indicating that the duration satisfies a threshold, and may wait for a subsequent storage opportunity to save the indication in one or more storage elements 345. A storage opportunity may be a time period during which memory device 305 is idle or is performing operations that consume less than a threshold amount of power, etc.

In some cases, logic circuitry 340 may identify a storage opportunity based on a signal received from a controller 350. For example, controller 350 may provide, to logic circuitry 340, a signal indicating that memory device 305 is operating in an idle state to enable logic circuitry 340 to identify the storage opportunity. Controller 350 may be (or may be included in) a local memory controller 165, 260, device memory controller 155, or external memory controller 105 as described with reference to FIGS. 1 and 2. In some cases, logic circuitry 340 may be included in controller 350.

In some cases, one or more storage elements 345 may be associated with an alert, such that when an indication is stored in the storage element 345, the alert is transmitted to an external device 355, such as a host processor or other device. For example, in some cases, blowing a particular fuse in a set of fuses may cause an alert to be transmitted to the external device 355. Such alerts may be associated with the memory device 305 approaching or reaching a critical or notable duration over which it has been operated with operating conditions outside of an operating range, and may enable memory device 305 to notify an external device 355 that memory device 305 may be degrading. In some cases, multiple storage elements 345 may be associated with alerts, such that memory device 305 may transmit successive alerts to an external device indicating an increasing likelihood that memory device 305 may be degrading.

In some cases, the set of storage elements 345 may include one or more registers that may comprise volatile storage elements. In some cases, memory device 305 may track the quantity of times the duration satisfies the threshold, and may store an indication of the quantity of times in a register. In some cases, an external device may read the register to determine the health status of the memory device 305. In some cases, a memory device 305 may clear the register when it is read, or modify a value in a separate status register (e.g., a register that may be commonly polled to read other status information) to indicate when the quantity of times stored in the register has been updated.

In some cases, memory device 305 may provide, to an external device, an indication each time the threshold is met (e.g., via a pin) so that the external device doesn't have to continually read a register to determine if the value has changed, for example.

In some cases, one or more sensors 320 may be off-die or off of the memory device, such as at another location within a system that includes a memory device and a host processor. In some cases, the host processor may determine that an operating condition associated with the system and/or with an array of memory cells on a memory device is outside a range, and monitor, based on determining that the operating condition is outside the range, a duration over which the operating condition is outside the range. The host processor may determine that the duration satisfies a threshold based on monitoring the duration, and may store, in a storage element based on determining that the duration satisfies the threshold, an indication that the duration satisfies the threshold. The storage element may be on a memory device or on a memory die, for example.

Figure 4:
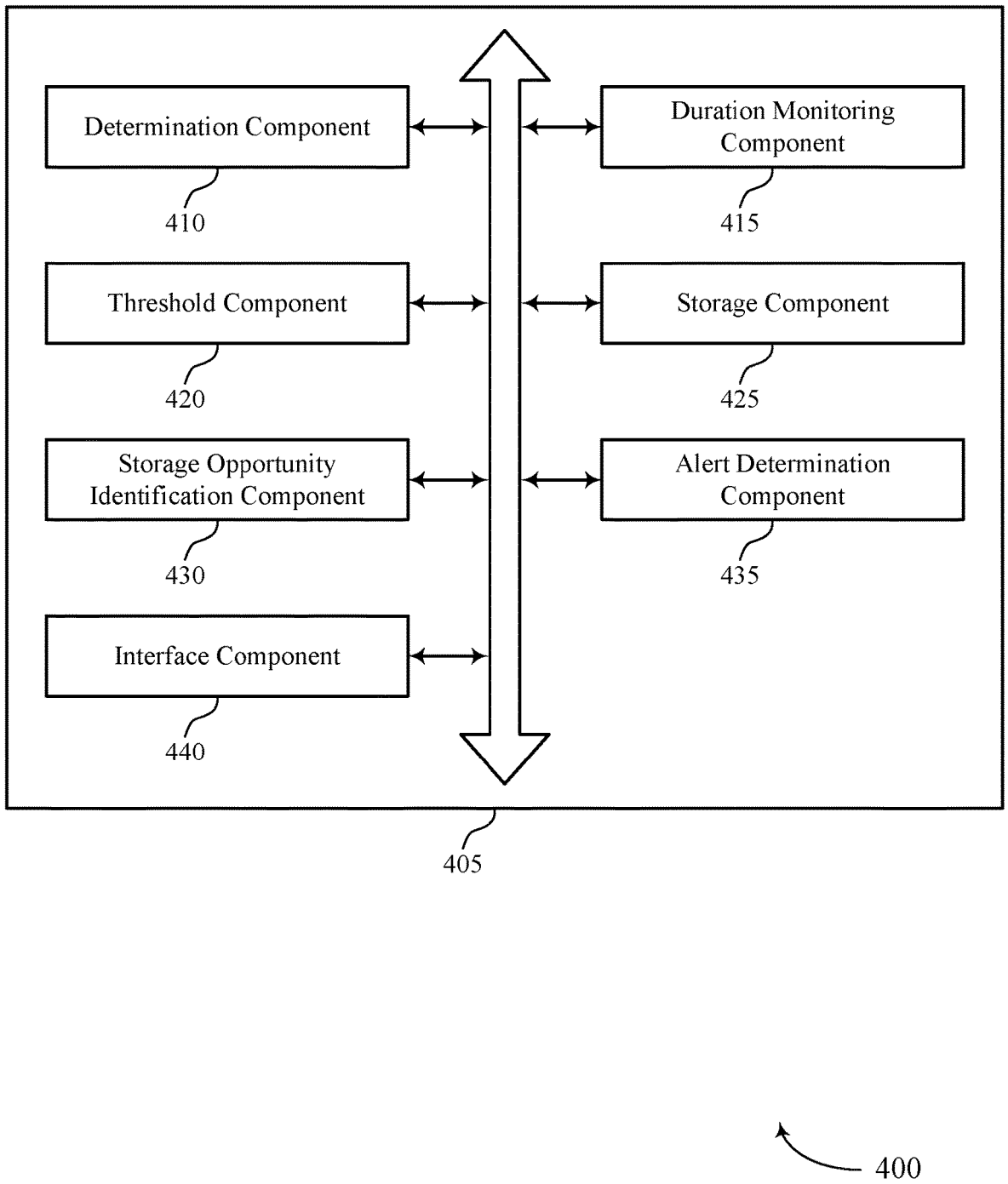
FIG. 4 shows a block diagram of a memory array that supports persistent health monitoring for volatile memory devices in accordance with aspects of the present disclosure.

FIG. 4 shows a block diagram 400 of a memory device 405 that supports persistent health monitoring for volatile memory devices in accordance with examples as disclosed herein. The memory device 405 may be an example of aspects of a memory device or memory die as described with reference to FIGS. 1-3. The memory device 405 may include a determination component 410, a duration monitoring component 415, a threshold component 420, a storage component 425, a storage opportunity identification component 430, an alert determination component 435, and an interface component 440. Each of these modules may communicate, directly or indirectly, with one another (e.g., via one or more buses).

The determination component 410 may determine that an operating condition associated with an array of memory cells is outside a range. In some examples, the determination component 410 may determine that a second operating condition associated with the array of memory cells is outside of a second range. In some examples, the determination component 410 may determine an amount by which the operating condition is outside of the range. In some cases, the operating condition includes one or more of a temperature, a power, a voltage, a current, or a or a health status determined based on detection of memory errors of the array of memory cells The duration monitoring component 415 may monitor, based on determining that the operating condition is outside the range, a duration over which the operating condition is outside the range. In some examples, the duration monitoring component 415 may start a timer based on the determination that the operating condition is outside of the range, where the duration is monitored based on an elapsed time after starting the timer. In some examples, the duration monitoring component 415 may restart the timer when the duration satisfies the threshold.

The threshold component 420 may determine that the duration satisfies a threshold based on monitoring the duration. In some examples, the threshold component 420 may determine the threshold based on the determination that the operating condition is outside of the range and the determination that the second operating condition is outside of the second range. In some examples, the threshold component 420 may determine the threshold based on the amount by which the operating condition is outside of the range.

The storage component 425 may store, in a storage element based on determining that the duration satisfies the threshold, an indication that the duration satisfies the threshold. In some examples, the storage component 425 may select, based on the threshold, the storage element from a set of storage elements, where each storage element of the set of storage elements is associated with a respective threshold.

In some examples, the storage component 425 may store the indication in a volatile storage element.

In some examples, the storage component 425 may store the indication in a non-volatile storage element. In some examples, storing the indication in the storage element includes programming a one-time programmable storage element.

In some examples, the storage component 425 may store, based on a determination that an elapsed time after restarting the timer satisfies the threshold, a second indication in a second non-volatile storage element. In some examples, storing the indication in the non-volatile storage element includes programming a first one-time programmable storage element and storing the second indication in the second non-volatile storage element includes programming a second one-time programmable storage element. In some cases, the first one-time programmable storage element and the second one-time programmable storage element are consecutive one-time programmable storage elements within an array of one-time programmable storage elements.

In some cases, the non-volatile storage element includes one or more programmable non-volatile memory cells, and where storing the indication in the non-volatile storage element includes adjusting a value stored in the one or more programmable non-volatile memory cells.

In some cases, a storage opportunity identification component 430 may identify a storage opportunity after storing the indication in the volatile storage element, where storing the indication in the non-volatile storage element includes reading the indication from the volatile storage element, and storing the indication in the non-volatile storage element during the storage opportunity. The storage opportunity identification component 430 may identify the storage opportunity by identifying a time period during which the array of memory cells is idle.

The alert determination component 435 may determine that the non-volatile storage element is associated with an alert. In some examples, the alert determination component 435 may transmit the alert to an external device based on the determination that the non-volatile storage element is associated with the alert.

The interface component 440 may receive, from an external device, a request for the indication. In some examples, the interface component 440 may transfer the indication from the storage element to the external device based on the request.

Figure 5:
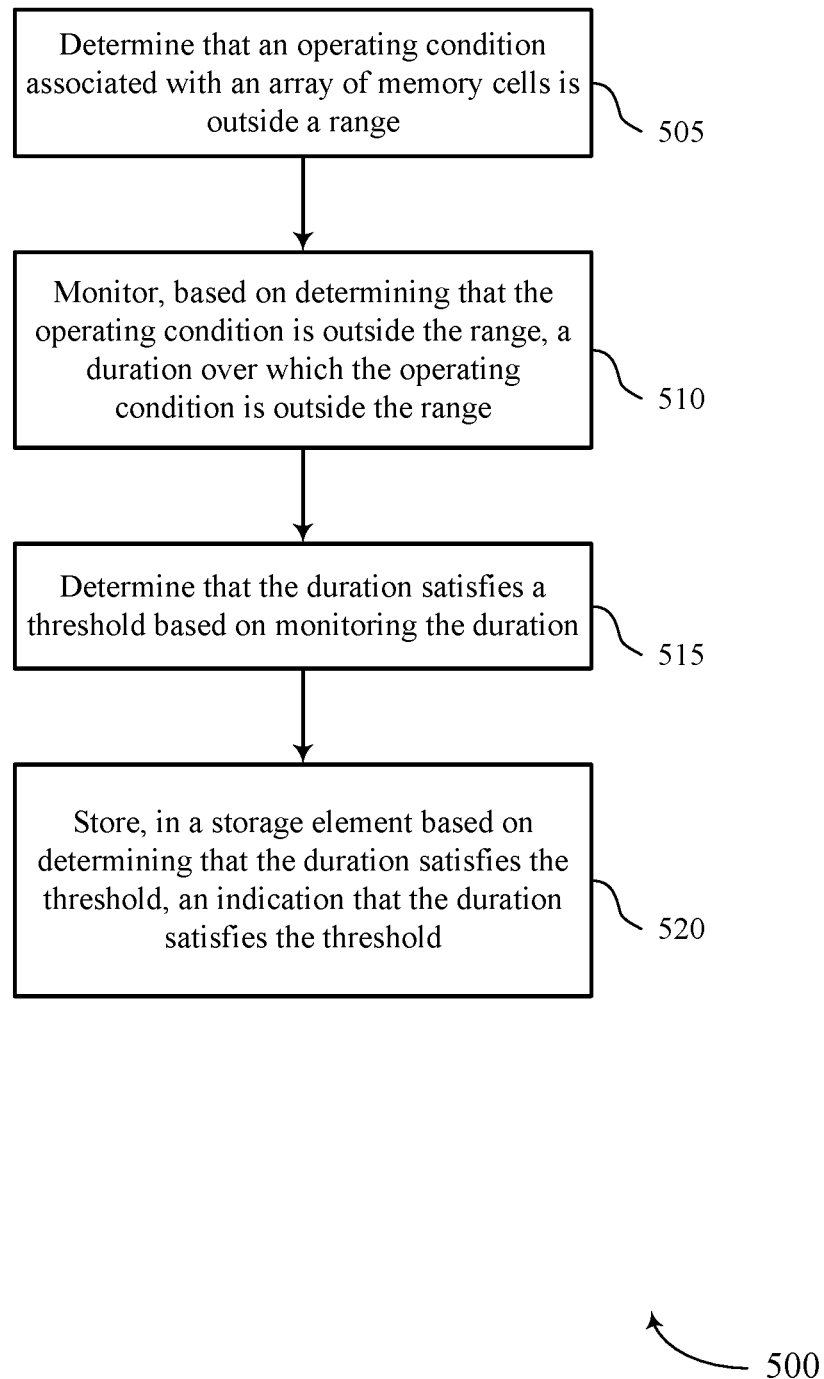
FIG. 5 shows a flowchart illustrating a method or methods that support persistent health monitoring for volatile memory devices in accordance with examples as disclosed herein.

FIG. 5 shows a flowchart illustrating a method or methods 500 that supports persistent health monitoring for volatile memory devices in accordance with aspects of the present disclosure. The operations of method 500 may be implemented by a memory device or its components as described herein. For example, the operations of method 500 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 505, the memory device may determine that an operating condition associated with an array of memory cells is outside a range. The operations of 505 may be performed according to the methods described herein. In some examples, aspects of the operations of 505 may be performed by a sensor, comparison element, and/or logic circuitry as described with reference to FIG. 3. In some examples, aspects of the operations of 505 may be performed by a determination component as described with reference to FIG. 4.

At 510, the memory device may monitor, based on determining that the operating condition is outside the range, a duration over which the operating condition is outside the range. The operations of 510 may be performed according to the methods described herein. In some examples, aspects of the operations of 510 may be performed by a timer as described with reference to FIG. 3. In some examples, aspects of the operations of 510 may be performed by a duration monitoring component as described with reference to FIG. 4.

At 515, the memory device may determine that the duration satisfies a threshold based on monitoring the duration. The operations of 515 may be performed according to the methods described herein. In some examples, aspects of the operations of 515 may be performed by a timer and/or logic circuitry as described with reference to FIG. 3. In some examples, aspects of the operations of 515 may be performed by a threshold component as described with reference to FIG. 4.

At 520, the memory device may store, in a storage element based on determining that the duration satisfies the threshold, an indication that the duration satisfies the threshold. The operations of 520 may be performed according to the methods described herein. In some examples, aspects of the operations of 520 may be performed by a controller, logic circuitry, and/or a set of storage elements as described with reference to FIG. 3. In some examples, aspects of the operations of 520 may be performed by a storage component as described with reference to FIG. 4.

In some examples, an apparatus as described herein may perform a method or methods, such as the method 500. The apparatus may include features, means, or instructions (e.g., a non-transitory computer-readable medium storing instructions executable by a processor) for determining that an operating condition associated with an array of memory cells is outside a range, monitoring, based on determining that the operating condition is outside the range, a duration over which the operating condition is outside the range, determining that the duration satisfies a threshold based on monitoring the duration, and storing, in a storage element and based on determining that the duration satisfies the threshold, an indication that the duration satisfies the threshold.

In some examples of the method 500 and the apparatus described herein, the array of memory cells may be an array of volatile memory cells and the storage element may be a non-volatile storage element.

In some examples of the method 500 and the apparatus described herein, operations, features, means, or instructions for storing the indication in the non-volatile storage element may include operations, features, means, or instructions for selecting, based on the threshold, the non-volatile storage element from a set of non-volatile storage elements, where each non-volatile storage element of the set of non-volatile storage elements may be associated with a respective threshold.

In some examples of the method 500 and the apparatus described herein, operations, features, means, or instructions for storing the indication in the non-volatile storage element may include operations, features, means, or instructions for programming a one-time programmable storage element.

Some examples of the method 500 and the apparatus described herein may further include operations, features, means, or instructions for storing the indication in a volatile storage element, and identifying a storage opportunity after storing the indication in the volatile storage element, where storing the indication in the non-volatile storage element includes reading the indication from the volatile storage element, and storing the indication in the non-volatile storage element during the storage opportunity.

In some examples of the method 500 and the apparatus described herein, operations, features, means, or instructions for identifying the storage opportunity may include operations, features, means, or instructions for identifying a time period during which the array of volatile memory cells may be idle.

In some examples of the method 500 and the apparatus described herein, the non-volatile storage element includes one or more programmable non-volatile memory cells, and storing the indication in the non-volatile storage element includes adjusting a value stored in the one or more programmable non-volatile memory cells.

Some examples of the method 500 and the apparatus described herein may further include operations, features, means, or instructions for determining that the non-volatile storage element may be associated with an alert, and transmitting the alert to an external device based on the determination that the non-volatile storage element may be associated with the alert.

Some examples of the method 500 and the apparatus described herein may further include operations, features, means, or instructions for determining that a second operating condition associated with the array of volatile memory cells may be outside of a second range, and determining the threshold based on the determination that the operating condition may be outside of the range and the determination that the second operating condition may be outside of the second range.

Some examples of the method 500 and the apparatus described herein may further include operations, features, means, or instructions for determining an amount by which the operating condition may be outside of the range, and determining the threshold based on the amount by which the operating condition may be outside of the range.

In some examples of the method 500 and the apparatus described herein, operations, features, means, or instructions for monitoring the duration may include operations, features, means, or instructions for starting a timer based on the determination that the operating condition may be outside of the range, where the duration may be monitored based on an elapsed time after starting the timer.

Some examples of the method 500 and the apparatus described herein may further include operations, features, means, or instructions for restarting the timer when the duration satisfies the threshold, and storing, based on a determination that an elapsed time after restarting the timer satisfies the threshold, a second indication in a second non-volatile storage element.

In some examples of the method 500 and the apparatus described herein, storing the indication in the non-volatile storage element may include operations, features, means, or instructions for programming a first one-time programmable storage element and storing the second indication in the second non-volatile storage element.

In some examples of the method 500 and the apparatus described herein, the first one-time programmable storage element and the second one-time programmable storage element may be consecutive one-time programmable storage elements within an array of one-time programmable storage elements.

In some examples of the method 500 and the apparatus described herein, the operating condition includes one or more of a temperature, a power, a voltage, a current, or a health status determined based on detection of memory errors of the array of volatile memory cells.

Some examples of the method 500 and the apparatus described herein may further include operations, features, means, or instructions for receiving, from an external device, a request for the indication, and transferring the indication from the storage element to the external device based on the request.

It should be noted that the methods described above describe possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0V) but that is not directly coupled with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

As used herein, the term "electrode" may refer to an electrical conductor, and in some cases, may be employed as an electrical contact to a memory cell or other component of a memory array. An electrode may include a trace, wire, conductive line, conductive layer, or the like that provides a conductive path between elements or components of memory array.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   determining that an operating condition associated with an array of memory cells is outside a range;
   monitoring, based at least in part on determining that the operating condition is outside the range, a duration over which the operating condition is outside the range;
   determining that the duration over which the operating condition is outside the range satisfies a threshold based at least in part on monitoring the duration; and
   storing, in a storage element based at least in part on determining that the duration satisfies the threshold, an indication that the duration over which the operating condition is outside the range satisfies the threshold.

2. The method of claim 1, wherein the array of memory cells is an array of volatile memory cells and the storage element is a non-volatile storage element.

3. The method of claim 2, wherein storing the indication in the non-volatile storage element comprises:
   selecting, based at least in part on the threshold, the non-volatile storage element from a set of non-volatile storage elements, wherein each non-volatile storage element of the set of non-volatile storage elements is associated with a respective threshold.

4. The method of claim 2, wherein storing the indication in the non-volatile storage element comprises programming a one-time programmable storage element.

5. A method, comprising:
   determining that an operating condition associated with an array of volatile memory cells is outside a range;
   monitoring, based at least in part on determining that the operating condition is outside the range, a duration over which the operating condition is outside the range;
   determining that the duration satisfies a threshold based at least in part on monitoring the duration;
   storing, based at least in part on determining that the duration satisfies the threshold, an indication that the duration satisfies the threshold in a volatile storage element;
   identifying a storage opportunity after storing the indication in the volatile storage element;
   reading the indication from the volatile storage element; and
   storing the indication in a non-volatile storage element during the storage opportunity.

6. The method of claim 5, wherein identifying the storage opportunity comprises identifying a time period during which the array of volatile memory cells is idle.

7. The method of claim 2, wherein the non-volatile storage element comprises one or more programmable non-volatile memory cells, and wherein storing the indication in the non-volatile storage element comprises adjusting a value stored in the one or more programmable non-volatile memory cells.

8. The method of claim 2, wherein the array of volatile memory cells resides on a memory device, further comprising:
   determining that the non-volatile storage element is associated with an alert; and
   transmitting the alert to an external device based at least in part on the determination that the non-volatile storage element is associated with the alert.

9. The method of claim 2, further comprising:
   determining that a second operating condition associated with the array of volatile memory cells is outside of a second range; and
   determining the threshold based at least in part on the determination that the operating condition is outside of the range and the determination that the second operating condition is outside of the second range.

10. The method of claim 2, further comprising:
    determining an amount by which the operating condition is outside of the range; and
    determining the threshold based at least in part on the amount by which the operating condition is outside of the range.

11. The method of claim 2, wherein monitoring the duration comprises:
    starting a timer based at least in part on the determination that the operating condition is outside of the range, wherein the duration is monitored based at least in part on an elapsed time after starting the timer.

12. The method of claim 11, further comprising:
    restarting the timer when the duration satisfies the threshold; and
    storing, based at least in part on a determination that an elapsed time after restarting the timer satisfies the threshold, a second indication in a second non-volatile storage element.

13. The method of claim 12, wherein storing the indication in the non-volatile storage element comprises programming a first one-time programmable storage element and storing the second indication in the second non-volatile storage element comprises programming a second one-time programmable storage element.

14. The method of claim 13, wherein the first one-time programmable storage element and the second one-time programmable storage element are consecutive one-time programmable storage elements within an array of one-time programmable storage elements.

15. The method of claim 1, wherein the operating condition comprises one or more of a temperature, a power, a voltage, a current, or a health status determined based at least in part on detection of memory errors of the array of memory cells.

16. The method of claim 1, further comprising:
    receiving, from an external device, a request for the indication; and
    transferring the indication from the storage element to the external device based at least in part on the request.

17. A memory device, comprising:
    an array of volatile memory cells; and
    a controller coupled with the array of volatile memory cells and operable to cause the memory device to:
      determine that an operating condition associated with the array of volatile memory cells is outside of a range;
      monitor, based at least in part on the determination that the operating condition is outside of the range, a duration over which the operating condition is outside of the range;
      determine that the duration over which the operating condition is outside the range satisfies a threshold based at least in part on monitoring the duration; and
      store, in a non-volatile storage element based at least in part on determining that the duration satisfies the threshold, an indication that the duration over which the operating condition is outside the range satisfies the threshold.

18. The memory device of claim 17, wherein the controller is operable to cause the memory device to store the indication in the non-volatile storage element by causing the memory device to:
   select, based at least in part on the threshold, the non-volatile storage element from a set of non-volatile storage elements, wherein each non-volatile storage element of the set of non-volatile storage elements is associated with a respective threshold.

19. The memory device of claim 18, wherein the controller is operable to cause the memory device to store the indication in the non-volatile storage element by causing the memory device to:
   program a one-time programmable storage element of a set of one-time programmable storage elements that resides on a die with the array of volatile memory cells.

20. The memory device of claim 17, wherein the controller is further operable to cause the memory device to:
   determine, based at least in part on storing the indication in the non-volatile storage element, that the non-volatile storage element is associated with an alert; and
   transmit the alert to an external device based at least in part on the determination that the non-volatile storage element is associated with the alert.

21. A device, comprising:
   an array of volatile memory cells;
   a sensor configured to sense an operating condition associated with the array of volatile memory cells and output a first signal based on the operating condition;
   a comparison element configured to determine whether the operating condition is outside a range and output a second signal based at least in part on the determination;
   a timer coupled with the comparison element and configured to:
      initiate timing based at least in part on the second signal indicating that the operating condition is outside the range, and
      output a third signal a threshold duration after initiating the timing, the third signal indicating that the operating condition is outside the range for at least the threshold duration; and
   logic circuitry coupled with a set of non-volatile storage elements and configured to receive an indication of the third signal and program one or more non-volatile storage elements of the set of non-volatile storage elements based at least in part on the indication of the third signal.

22. The device of claim 21, wherein the logic circuitry is configured to select at least some of the one or more non-volatile storage elements based at least in part on the threshold duration or a location of the one or more non-volatile storage elements within the set of non-volatile storage elements.

23. The device of claim 21, wherein the set of non-volatile storage elements comprises a set of one-time programmable storage elements on a die with the array of volatile memory cells, each one-time programmable storage element of the set of one-time programmable storage elements associated with an occurrence of a duration of the operating condition satisfying the threshold duration.

24. The device of claim 21, wherein the logic circuitry is configured to:
   determine, based at least in part on programming the one or more non-volatile storage elements, that the one or more non-volatile storage elements are associated with an alert, and
   send the alert to an external device based on the determination that the one or more non-volatile storage elements are associated with the alert.

25. The device of claim 21, further comprising:
a counter coupled with the timer and configured to:
   store a value associated with a quantity of occurrences of the third signal; and
   send an indication of the quantity of occurrences of the third signal to the logic circuitry.

* * * * *